US008325882B1

(12) United States Patent  (10) Patent No.: US 8,325,882 B1
Klesper et al.  (45) Date of Patent: Dec. 4, 2012

(54) PROVIDING CONTEXT INFORMATION FOR EMERGENCY CALLS

(75) Inventors: Stevan A. Klesper, Gardner, KS (US); Arun Santharam, Olathe, KS (US); Timothy Kevin McGinnis, Overland Park, KS (US); Lyle Walter Paczkowski, Mission Hills, KS (US); Ray N. Durkin, De Soto, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1567 days.

(21) Appl. No.: 11/764,584

(22) Filed: Jun. 18, 2007

(51) Int. Cl.
*H04M 11/04* (2006.01)
(52) U.S. Cl. ............ 379/45; 379/33; 379/37; 379/88.19
(58) Field of Classification Search .................... 379/45, 379/33, 37, 88.19, 88.21, 118
See application file for complete search history.

(56) References Cited

U.S. PATENT DOCUMENTS

| 6,058,179 | A  | * | 5/2000 | Shaffer et al. ............ 379/220.01 |
| 6,993,118 | B2 |   | 1/2006 | Antonucci et al. |
| 2006/0023848 | A1 | * | 2/2006 | Mohler et al. .................. 379/41 |
| 2006/0159235 | A1 | * | 7/2006 | Eisner et al. .................... 379/45 |

* cited by examiner

*Primary Examiner* — Yuwen Pan
*Assistant Examiner* — Yosef K Laekemariam

(57) ABSTRACT

A communication network comprises a calling device, a call processing system, and a customer information system. The calling device transmits a call request for an emergency call to the call processing system. The call request includes a caller identification that identifies a caller. The call processing system receives the call request, generates and transfers first signaling for the call that includes the caller identification and a key, and generates and transfers second signaling for the call that includes the key. The customer information system has a plurality of context information stored in association with a plurality of caller identifications. The customer information system receives the first signaling for the call, processes the caller identification to determine a context information from the plurality of context information associated with the caller identification, and stores the key in association with the context information.

19 Claims, 9 Drawing Sheets

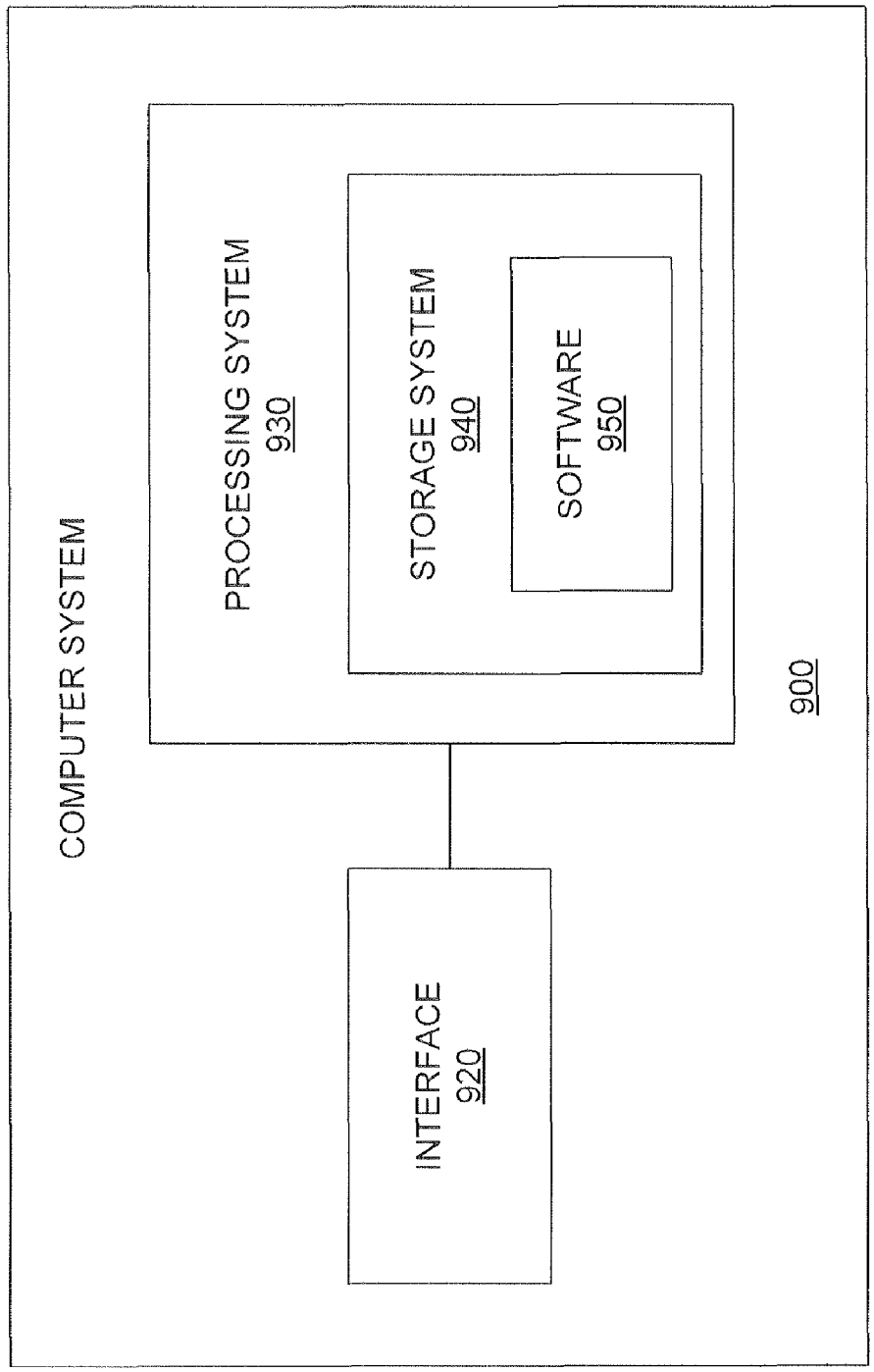

PROVIDING CONTEXT INFORMATION FOR EMERGENCY CALLS

BACKGROUND OF THE INVENTION

1. Field of the Invention

This invention relates to the field of telecommunications, and more particularly, to providing context information for emergency calls.

2. Description of the Prior Art

Telecommunication carriers are required by government regulations to provide emergency calling services to their customers. In the United States and Canada, 9-1-1 is the official emergency phone number that callers can dial in order to reach dispatch personnel at public safety answering points (PSAP). When a caller dials 911 from a telephone, the call is routed by a carrier to receiving equipment at a PSAP facility. A dispatcher at the facility answers the call and assists the caller with their emergency.

Often times, dispatchers must dispatch first responder personnel to the scene of an emergency to render assistance to callers. In the past, dispatchers had to ask a caller for his location. Over time, most telecommunication carriers developed the capability to automatically determine the location of landline callers. For instance, landline callers can be located based on their phone number. In the case of broadband voice calls, callers can be located based on the identity of their broadband equipment.

Most carriers have also implemented solutions for determining the location of mobile callers. In the prior art, wireless carriers have employed several different solutions to locate callers in need of emergency service, such as providing the location of the cell tower servicing a call to a PSAP. In another example, wireless carriers employ triangulation techniques to pinpoint the location of a caller. In yet another example, mobile devices with global position system (GPS) capability provide their GPS coordinates to the carrier, and in turn, to the PSAP.

FIGS. 1 and 2 are provided to illustrate how a caller location is determined in the prior art in the event of an emergency service call. In FIG. 1, communication network 100 includes caller 101, carrier network 120, emergency service network 130, location determination system 140, and response personnel 102. Caller 101 is in communication with carrier network 120. Carrier network 120 is coupled to both emergency service network 130 and location determination system 140. Emergency service network 130 is in communication with response personnel 102.

FIG. 2 is a flow diagram that illustrates the operation of communication network 100. As shown in FIG. 2, caller 101 places an emergency call to carrier network 120. Typically, caller 101 would dial 9-1-1 in order to place the call.

In most cases, the device used by the caller 101 transmits a caller identification, such as the phone number associated with the calling device, to carrier network 120. Carrier network 120 receives the emergency call and transfers a key request to location determination system 140. The key request includes the caller identification.

Location determination system 140 processes the request to select a key that will be used going forward to identify the call. Location determination system 140 returns a key response to carrier network 120 indicating the key. Location determination system 140 also stores the caller identification in association with the key for later queries by other systems.

Carrier network 120 then transfers signaling to emergency service network 130 to connect the call. The signaling typically includes the key. Upon receiving the call and the signaling, emergency service network 130 transfers a location query to location determination system 140. The location query indicates the key. Location determination system 140 processes the key to determine the caller identification associated with the key.

Having determined the caller identification, location determination system 140 processes the caller identification to determine the location of caller 101, such as by employing GPS, triangulation, or other such location schemes. Location determination system 140 then returns a query response to emergency service network 130 that indicates the location of caller 101. A dispatcher radios or otherwise communicates the location of caller 101 to response personnel 102 responding to the emergency.

While communication network 100 includes location determination capabilities, dispatchers in emergency service network 130 have no ability to seamlessly obtain and transfer other contextual information to the first responders. A dispatcher may be able to verbally obtain contextual information from the caller, or from a third party service, and then relay that information to response personnel.

Unfortunately, obtaining context information verbally is time consuming and error prone. Both callers and first responders are placed at risk by this problem. For example, callers may not receive the care they need if erroneous information is relayed to the response personnel. Requiring dispatchers to obtain and relay such information is also inefficient and limits dispatchers from assisting on other calls. First responders may encounter a situation that—if not adequately prepared or informed via accurate and timely context information—may endanger their own health and safety.

SUMMARY OF THE INVENTION

Embodiments of the invention solve the above problems and other problems by automatically providing context information for emergency service calls. In particular, embodiments of the invention include a customer information system that stores context information for callers in association with caller identifications. In response to an emergency service call that identifies a caller by a caller identification, a carrier network obtains a key used to correlate the call throughout the call provisioning process. The carrier network provides the key and the caller identification to the customer information system. The customer information system links the appropriate context information with the key based on the caller identification. The carrier network connects the call to an emergency service network and forwards the key to the emergency service network. The emergency service network communicates with the customer information system to obtain the relevant context information for the call using the key.

In an embodiment of the invention, a communication network comprises a calling device, a call processing system, and a customer information system. The calling device transmits a call request for an emergency call to the call processing system. The call request includes a caller identification that identifies a caller. The call processing system receives the call request, generates and transfers first signaling for the call that includes the caller identification and a key, and generates and transfers second signaling for the call that includes the key. The customer information system has a plurality of context information stored in association with a plurality of caller identifications. The customer information system receives the first signaling for the call, processes the caller identification to determine a context information from the plurality of context information associated with the caller identification, and stores the key in association with the context information.

BRIEF DESCRIPTION OF THE DRAWINGS

The same reference number represents the same element on all drawings.

FIG. 9 illustrates a computer system in an embodiment of the invention.

DETAILED DESCRIPTION OF THE INVENTION

FIGS. 3-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
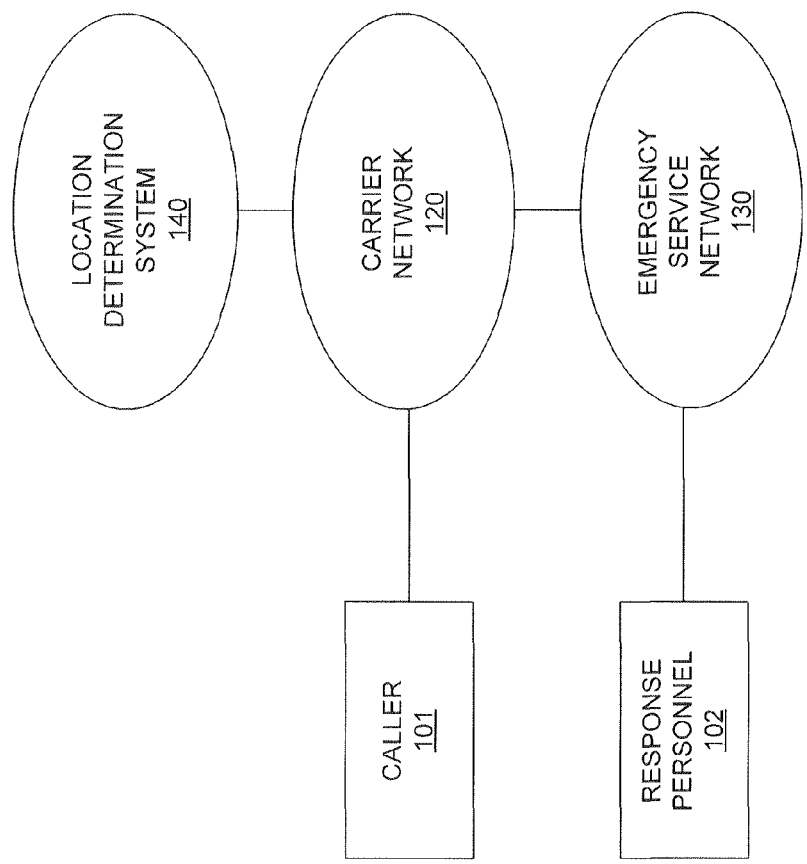
FIG. 1 illustrates a communication network in an example of the prior art.
Figure 2:
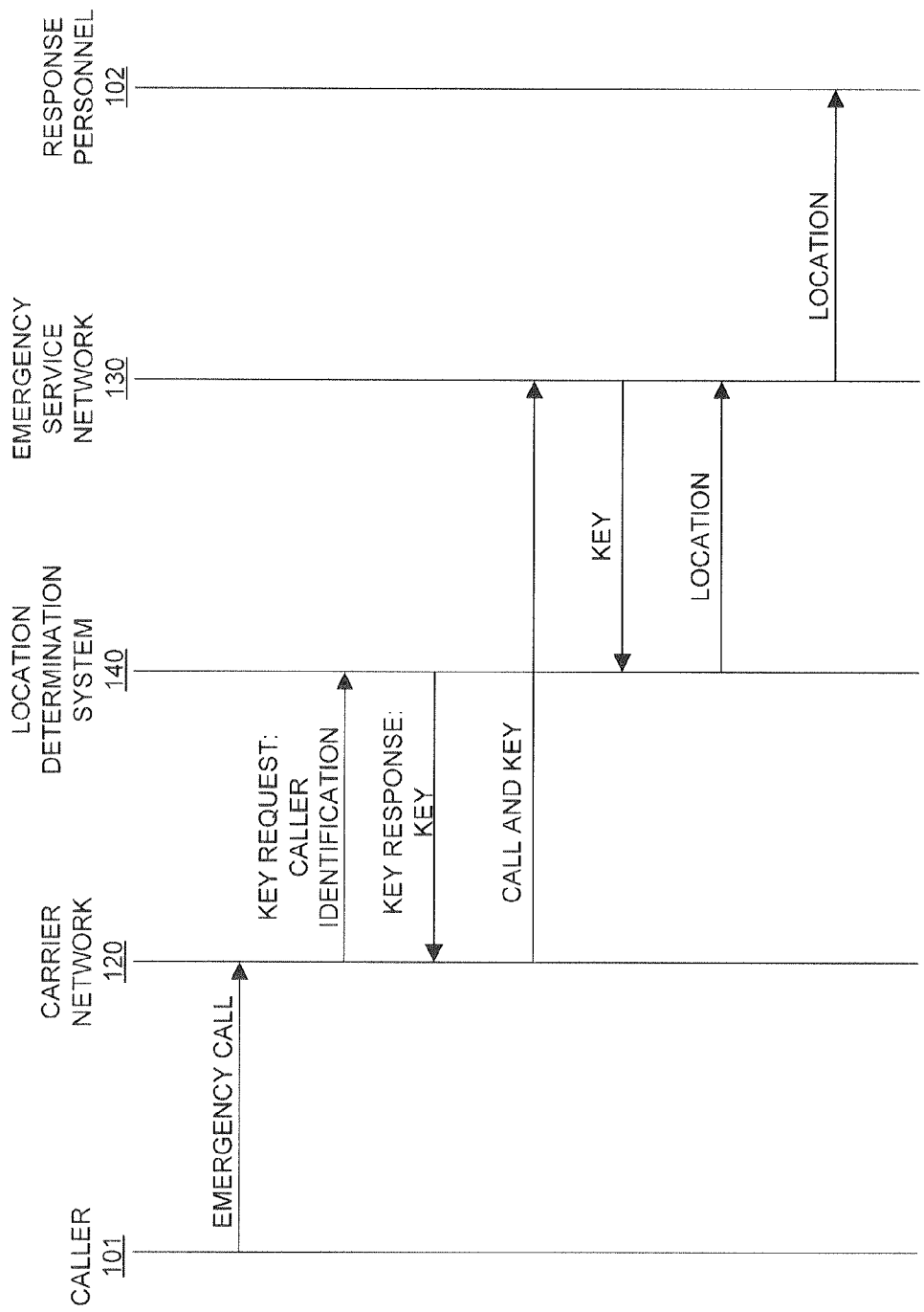
FIG. 2 illustrates a flow diagram in an example of the prior art.
Figure 3:
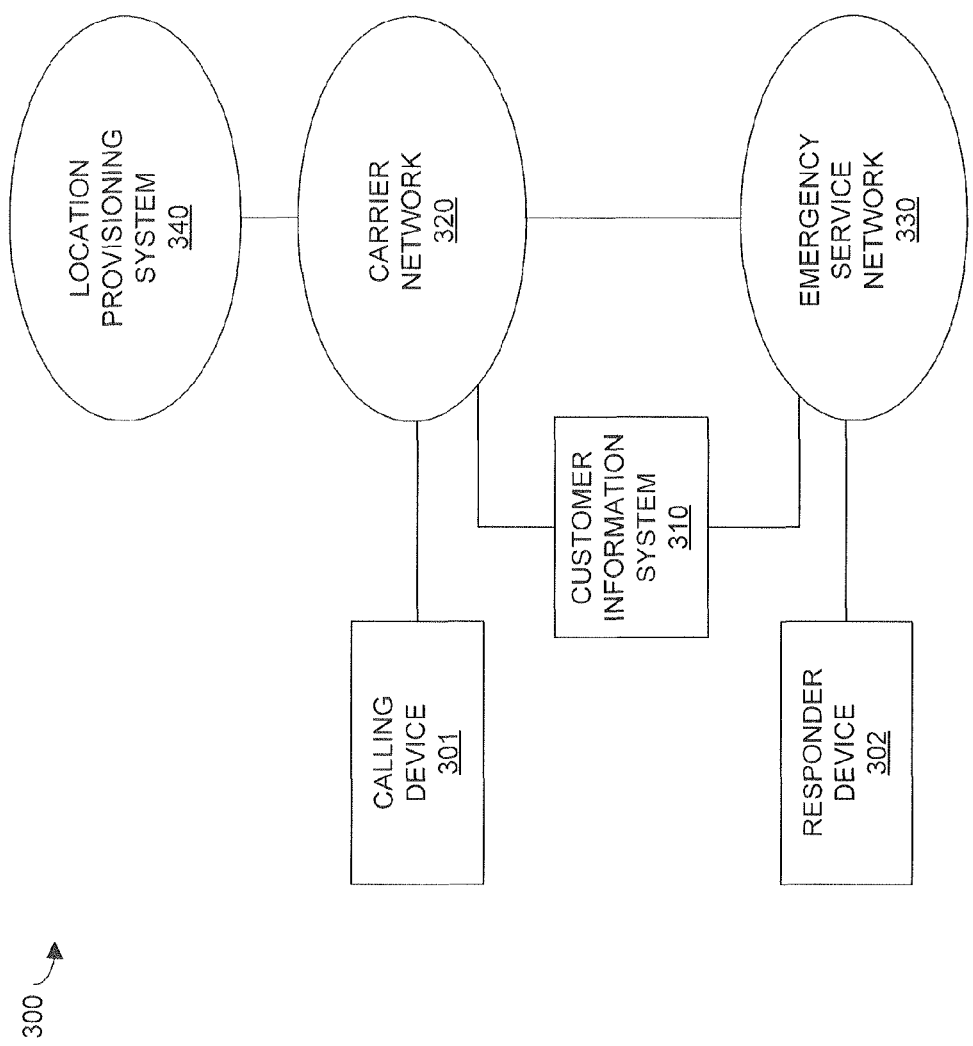
FIG. 3 illustrates a communication network in an embodiment of the invention.

In an advance, FIG. 3 illustrates communication network 300 that includes a customer information system 310 that stores context information for callers. In the event of an emergency service call, communication network 300 functions to gracefully select the appropriate context information for the call and provide the selected context information to the emergency service network that is responding on the emergency service call. The emergency service network can then provide the context information to first responders.

In this embodiment of the invention, communication network 300 includes calling device 301, carrier network 320, emergency service network 330, location provisioning system 340, responder device 302, and customer information system 310. Device 301 is connected to carrier network 320. Carrier network 320 is connected to emergency service network 330, location provisioning system 340, and customer information system 310. Emergency service network 330 is also connected to customer information system 310, as well as responder device 302.

Calling device 301 is any device capable of placing emergency calls to carrier network 320, such as a telephone, mobile phone, or a personal computer, as well as other types of calling devices.

Carrier network 320 is any network or collection of networks capable of receiving emergency calls from calling device 301 and connecting the calls to emergency service network 330. Examples of carrier networks include wireless communication networks, wireline communication networks, or packet communication networks, as well as any combination or variation thereof. Carrier network 320 is capable of communicating with customer information system 310, emergency service network 330, and location provisioning system 340.

Emergency service network 330 is any network or collection of networks capable of receiving and terminating an emergency call from carrier network 320. Furthermore, emergency service network 330 is any network capable of communicating with customer information system 310 and responder device 302.

Location provisioning system 340 is any system or collection of systems capable of providing location provisioning services for emergency calls placed to carrier network 320. Location provisioning system 340 is capable of communicating with both carrier network 320 and emergency service network 330 to determine the location of emergency calls.

Responder device 302 could be any device, such as a mobile phone, a laptop computer, or a tablet computer, capable of communicating with emergency service network 330. Responder device 302 could communicate with emergency service network 330 in a manner well known in the art, such as via a data link, a messaging system, or the like.

Customer information system 310 is any system capable of storing context information for a person in association with a caller identification for that person. Customer information system 310 can store individual files, documents, or records, as well as other types of data or context information, for multiple people. Each individual item of context information, whether a file, a document, a record, or the like, can be stored in association with a caller identification. The context information could comprise health information or medical treatment information. In another example, the context information could comprise information about physical dwellings where a caller resides.

In an embodiment, a standardized record could exist for each person represented in customer information system 310. The standardized record could be data-filled by each person via a network user interface, such as a web browser.

Figure 4:
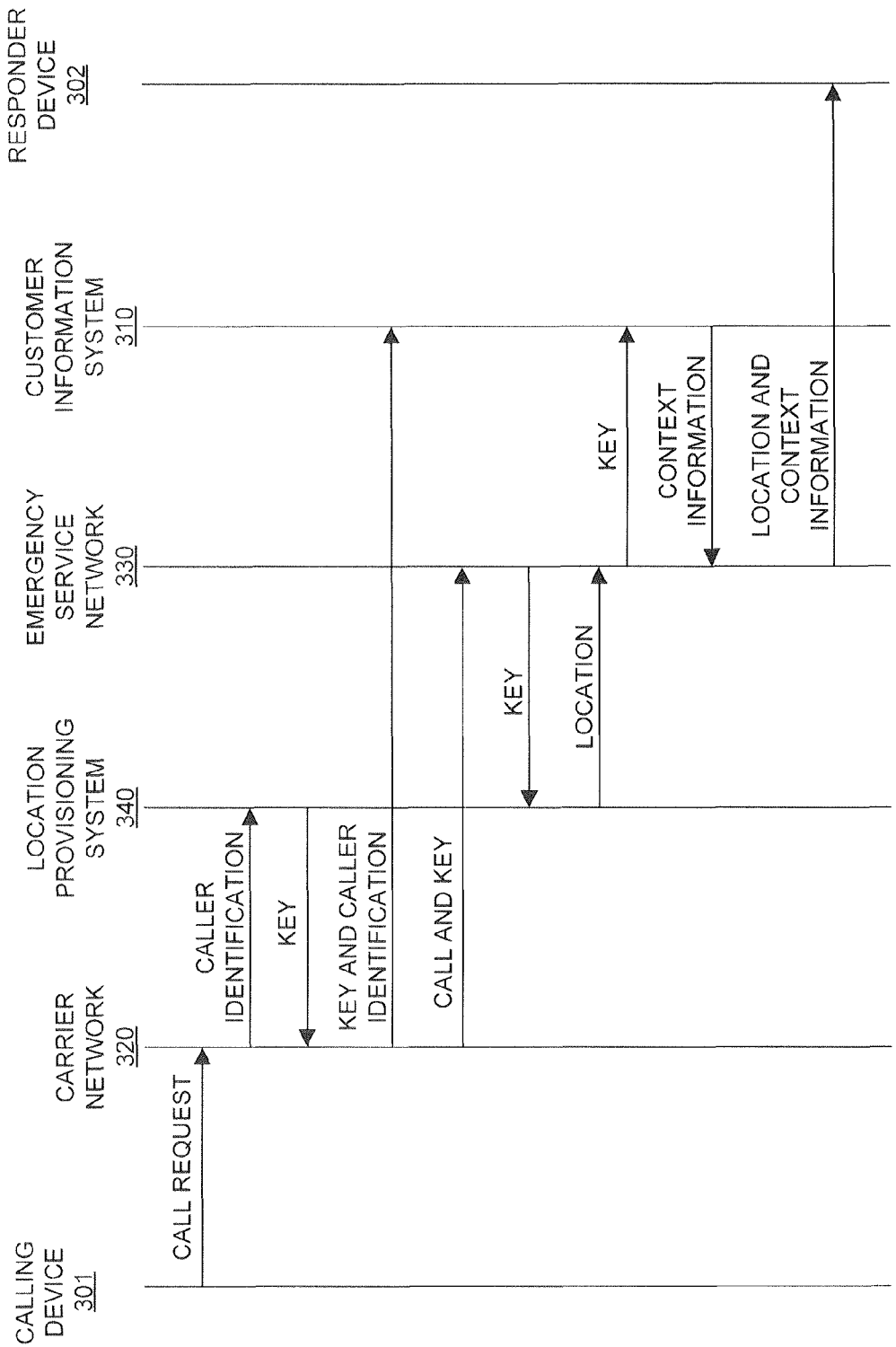
FIG. 4 illustrates a flow diagram in an embodiment of the invention.

FIG. 4 is a flow diagram that illustrates the operation of communication network 300 in an embodiment of the invention. A caller operating device 301 places a call to an emergency service, such as by dialing 9-1-1. Device 301 transmits a call request to carrier network 320 that identifies the requested service and includes a caller identification. In some cases, the caller identification identifies a phone number associated with the calling device 301 utilized by the caller. In other cases, the caller identification could identify the caller by a network address, a username, or the like.

In response to the call request, carrier network 320 transmits a key request to location provisioning system 340 that indicates the caller identification. Location provisioning system 340 selects a key from among a group of keys and transmits a response to carrier network 320 that indicates the selected key. Location provisioning system 340 also stores the caller identification in association with the selected key.

Upon receiving the response, carrier network 320 transmits a message to customer information system 310 that indicates both the key and the caller identification. Customer information system 310 receives and processes the message to determine context information associated with the caller identification. Customer information system 310 then stores the key in association with the selected context information.

Next, carrier network 320 transfers the call and signaling for the call to emergency service network 330. The signaling for the call identifies the key. Emergency service network 330 transmits a location request to location provisioning system 340 indicating the key. Location provisioning system 340 processes the key to determine the caller identification associated with the key. Location provisioning system 340 then processes the caller identification to determine the location of calling device 301. After determining the location of calling device 301, location provisioning system 340 returns a message to emergency service network 330 with the location of calling device 302.

Subsequently, or nearly simultaneously, emergency service network 330 transfers a context request to customer information system 310. The context request also indicates the key. Customer information system 310 processes the context request to determine the caller identification associated with the key. Upon determining the proper caller identification, customer information system 310 retrieves the context information associated with the caller identification and transmits the context information to emergency service network 330. Emergency service network 330 is then in possession of both the location of calling device 301 and context information associated with the caller. Emergency service network 330 transfers the location and the context information to the responder device 302 operated by response personnel responding to the emergency.

Figure 5:
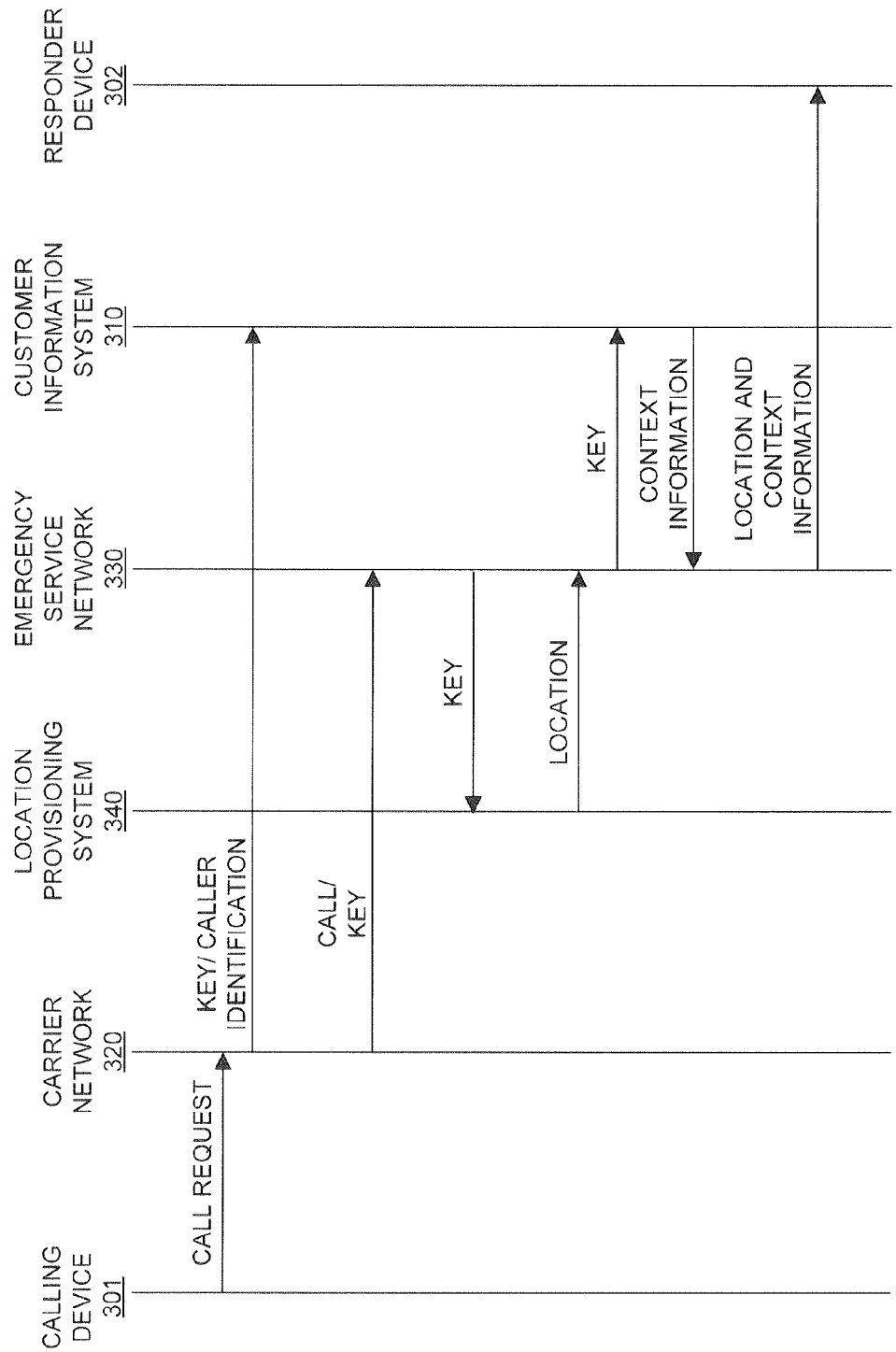
FIG. 5 illustrates a flow diagram in an embodiment of the invention.

FIG. 5 is another flow diagram that illustrates the operation of communication network 300 in another embodiment of the invention. A caller operating device 301 places a call to an emergency service, such as by dialing 9-1-1. Device 301 transmits a call request to carrier network 320 that identifies the requested service and includes a caller identification. In some cases, the caller identification identifies a phone number associated with the calling device 301 utilized by the caller. In other cases, the caller identification could identify the caller by a network address, a username, or the like.

In response to the call request, carrier network 320 selects a key to use to track the call. In an example, the key identifies calling device 301. In another example, the key identifies access equipment utilized by calling device 301 to access carrier network 320, such as a modem or a terminal adapter system.

Carrier network 320 transmits a message to customer information system 310 that indicates both the key and the caller identification. Customer information system 310 receives and processes the message to determine context information associated with the caller identification. Customer information system 310 then stores the key in association with the selected context information.

Carrier network 320 also transfers the call and signaling for the call to emergency service network 330. The signaling for the call identifies the key selected by carrier network 320 to track the call.

Emergency service network 330 responsively transfers a location request to location provisioning system 340. The location request identifies the key. Location provisioning system 340 processes the key to determine the location of calling device 301. For example, location provisioning system 340 could store a database having various device identifiers, such as media access control (MAC) addresses, stored in association with geographic locations. Upon determining the location of calling device 301, location provisioning system 340 returns the location to emergency service network 330.

Emergency service network 330 also transmits a context request to customer information system 310 indicating the key. Customer information system 310 processes the context request to determine the caller identification associated with the key. Upon determining the proper caller identification, customer information system 310 retrieves the context information associated with the caller identification and transmits the context information to emergency service network 330.

Emergency service network 330 eventually possesses both the location of calling device 301 and context information associated with the caller. Emergency service network 330 then transfers the location and the context information to the responder device 302 operated by the response personnel responding to the emergency.

As shown in FIG. 4 and FIG. 5, responder device 302 can advantageously obtain both the location of calling device 301 and context information associated with the caller from emergency service network 330. Such context information improves the ability of a first responder operating responder device 302 to respond to the emergency. The context information also reduces risks to the first responder. In another advantage, the same key used to obtain location information can be used to obtain context information.

Figure 6:
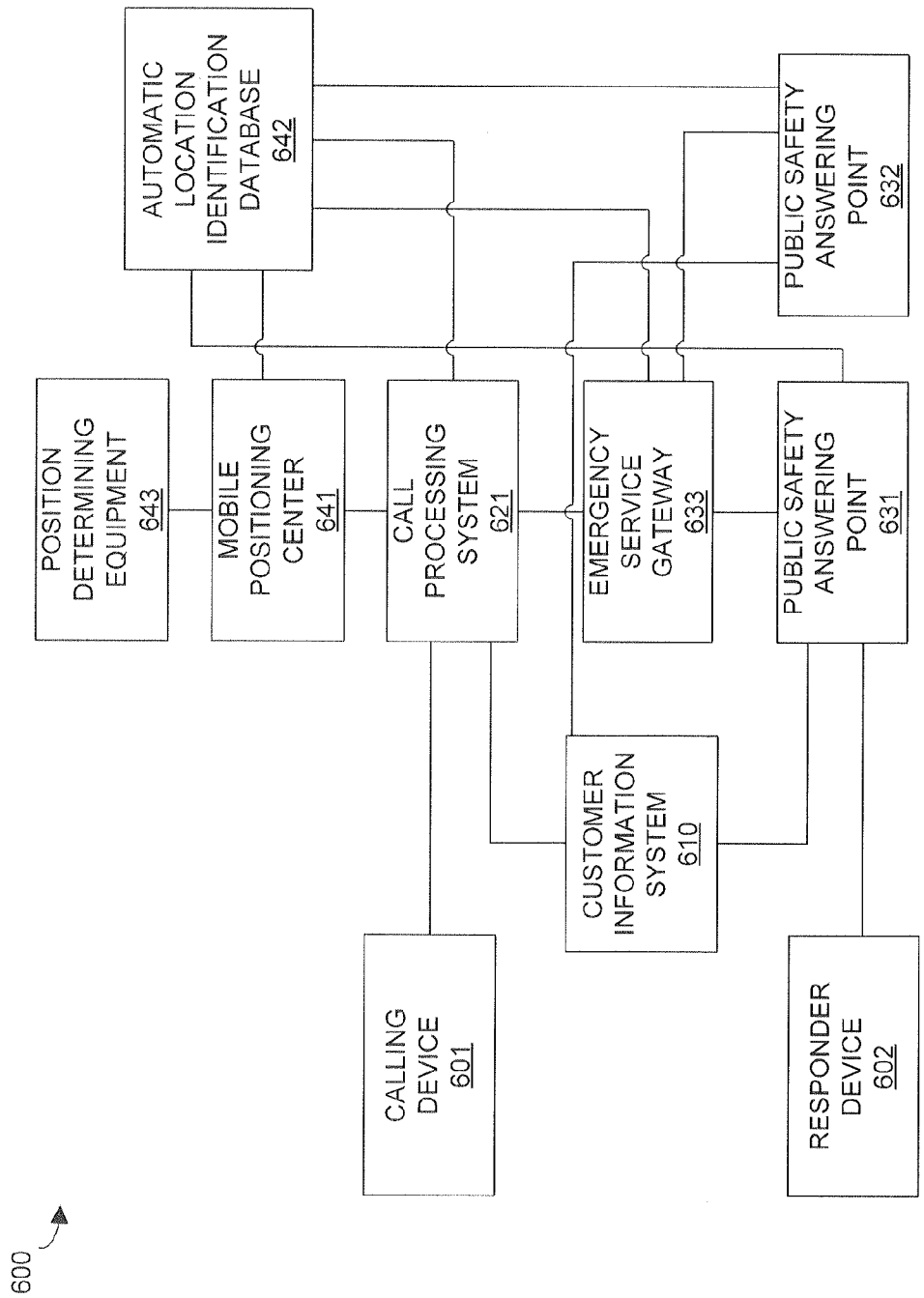
FIG. 6 illustrates a communication network in an embodiment of the invention.

FIG. 6 illustrates a communication network 600 in an embodiment of the invention. Communication network 600 includes calling device 601, call processing system 621, emergency service gateway 633, public safety answering point (PSAP) 631, PSAP 632, mobile positioning center 641, positioning determining equipment 643, automatic location identification (ALI) database 642, customer information system 610, and responder device 602.

Calling device 601 is connected to call processing system 621. Call processing system 621 is connected to emergency service gateway 633, customer information system 610, mobile positioning center 641, and ALI database 642. Emergency service gateway 633 is connected to call processing system 621, PSAP 631, and PSAP 632. PSAP 631 is connected to emergency service gateway 633, customer information system 610, ALI database 642, and responder device 602. Likewise, PSAP 632 is connected to emergency service gateway 633, customer information system 610, and ALI database 642. Mobile positioning center 641 is connected to position determining equipment 643, call processing system 621, and ALI database 642. Position determining equipment 643 is connected to mobile positioning center 641. Responder device 602 is connected to PSAP 631. ALI database 642 is connected to PSAP 631, PSAP 632, call processing system 621, mobile positioning center 641, and emergency service gateway 633. Customer information system 610 is connected to call processing system 621, PSAP 631, and PSAP 632.

Calling device 601 is any device capable of placing emergency calls to call processing system 621, such as a telephone, mobile phone, or a personal computer, as well as other types of calling devices.

Call processing system 621 is any system or collection of systems capable of receiving and processing emergency calls from calling device 601 to connect the calls to emergency service gateway 633. Examples of call processing systems include, but are not limited to, mobile switching centers, soft switches, or circuit switched telephony switches. Other types of call processing systems are possible. Call processing system 621 is also capable of communicating with mobile positioning center 641, ALI database 642, emergency service gateway 633, calling device 601, and customer information system 610.

Mobile positioning center 641 is any system or collection of systems capable of receiving and processing queries from call processing system 621 to select keys for correlating information on emergency calls. Mobile positioning center 641 is further capable of communicating with position determining equipment to locate callers for emergency service calls. Mobile positioning center 641 also communicates with ALI database 642, including exchanging queries and responses to determine the location of callers.

Emergency service gateway 633 is any system or collection of systems capable of communicating with ALI database 642 to select appropriate public safety answering points to handle emergency calls. Emergency service gateway 633 is further capable of communicating with PSAP 631 and PSAP 632, including connecting calls and transferring call signaling to PSAP 631 and PSAP 632. In an embodiment, emergency service gateway 633 could be a selective router.

PSAP 631 is any system or collection of systems capable of terminating emergency calls placed by calling device 601. PSAP 631 is capable of receiving the calls and associated signaling from emergency service gateway 633. PSAP 631 is further capable of exchanging communications, such as queries and responses, with ALI database 642 to determine the location of callers. PSAP 631 is also capable of communicating with customer information system 610 and responder device 602.

PSAP 632 is any system or collection of systems capable of terminating emergency calls placed by calling device 601. PSAP 632 is capable of receiving the calls and associated signaling from emergency service gateway 633. PSAP 632 is further capable of exchanging communications, such as queries and responses, with ALI database 642 to determine the location of callers. PSAP 632 is also capable of communicating with customer information system 610 and with other responder devices (not shown).

Customer information system 610 is any system capable of storing context information for a person in association with a caller identification for that person. Customer information system 610 can store individual files, documents, or records, as well as other types of data or context information, for multiple people. Each individual item of context information, whether a file, a document, a record, or the like, can be stored in association with a caller identification.

Responder device 602 could be any device, such as a mobile phone, a laptop computer, or a tablet computer, capable of communicating with PSAP 631. Responder device 602 could communicate with PSAP 631 in a manner well known in the art, such as via a data link, a messaging system, or the like.

Figure 7:
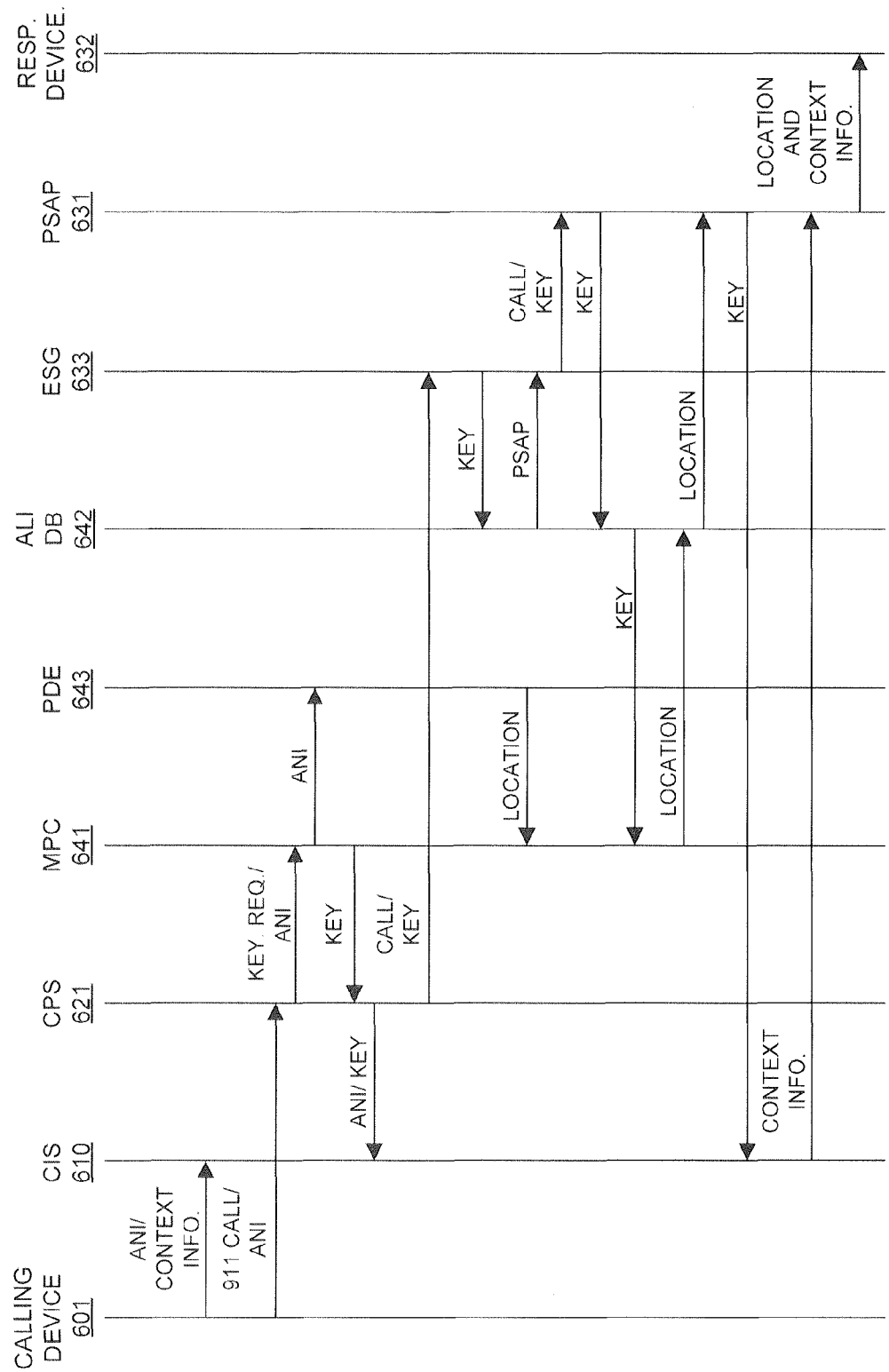
FIG. 7 illustrates a flow diagram in an embodiment of the invention.

FIG. 7 is a flow diagram illustrates the operation of communication network 600 in an embodiment of the invention. Early in operation, a user operating either calling device 601 or some other suitable communication device uploads context information to customer information system 610. The context information could be, for example, health or medical information for the user or other users, or information pertaining to the physical dwelling where the user resides. Other types of context information are possible.

During the upload process, the user provides a caller identification in association with which customer information system 610 stores the context information. In this example, a phone number for calling device 601, or the automatic number identification (ANI), is provided to customer information system 610 as the calling identification. The user could connect to customer information system 610 via any well known communication interface.

Later, the caller using calling device 601 places a call for an emergency service, such as by dialing 9-1-1. Calling device 601 transmits a call request to call processing system 621. The call request indicates the dialed digits as well as the ANI for calling device 601.

In response, call processing system 621 transmits a key request to mobile positioning center 641 that identifies the ANI. Mobile positioning center 641 processes the ANI to select a key from among a group of keys. The key is used henceforth for information correlation on the call. Mobile positioning center 641 returns a response to call processing system 621 with the key. Mobile positioning center 641 also transfers the ANI to position determining equipment 643. Position determining equipment 643 initiates a location determination process to determine the location of calling device 601 utilizing the ANI. Position determining equipment 643 returns the location of calling device 601 to mobile positioning center 641. Mobile positioning center 641 stores the location in association with the key.

Upon receiving the key, call processing system 621 transmits a message to customer information system 610 that indicates both the ANI and the key for the call. Customer information system 610 processes the ANI to determine context information associated with the ANI. Upon finding the context information, customer information system 610 stores the key in association with the context information.

Call processing system 621 eventually transfers the call and signaling for the call to emergency service gateway 633. The signaling for the call identifies the key. Emergency service gateway 633 responsively transmits a PSAP request to ALI database 642 that indicates the key. ALI database 642 processes the key to select the appropriate PSAP for the call from PSAP 631 and 632. ALI database 642 returns a response indicating PSAP 631 to emergency service gateway 633. Emergency service gateway 633 transfers the call and signaling for the call to PSAP 631. The key is also included in this signaling.

Upon receiving the call and the key, PSAP 631 transfers a location request to ALI database 642 that indicates the key. ALI database 642 forwards the location request, or another corresponding message, to mobile positioning center 641.

Upon receiving the location request, mobile positioning center 641 looks-up the location of calling device 601 based on the key and returns the location to ALI database 642. ALI database 642 responsively returns the location of calling device 601 in a message to PSAP 631.

In order to respond to the emergency call, PSAP 631 transfers a context request to customer information system 610. The context request indicates the key. Customer information system 610 processes the key to determine the context information associated with the key. Customer information system 610 returns the selected context information to PSAP 631. PSAP 631 then transfers both the location of calling device 601 and the context information associated with the caller to responder device 602.

Figure 8:
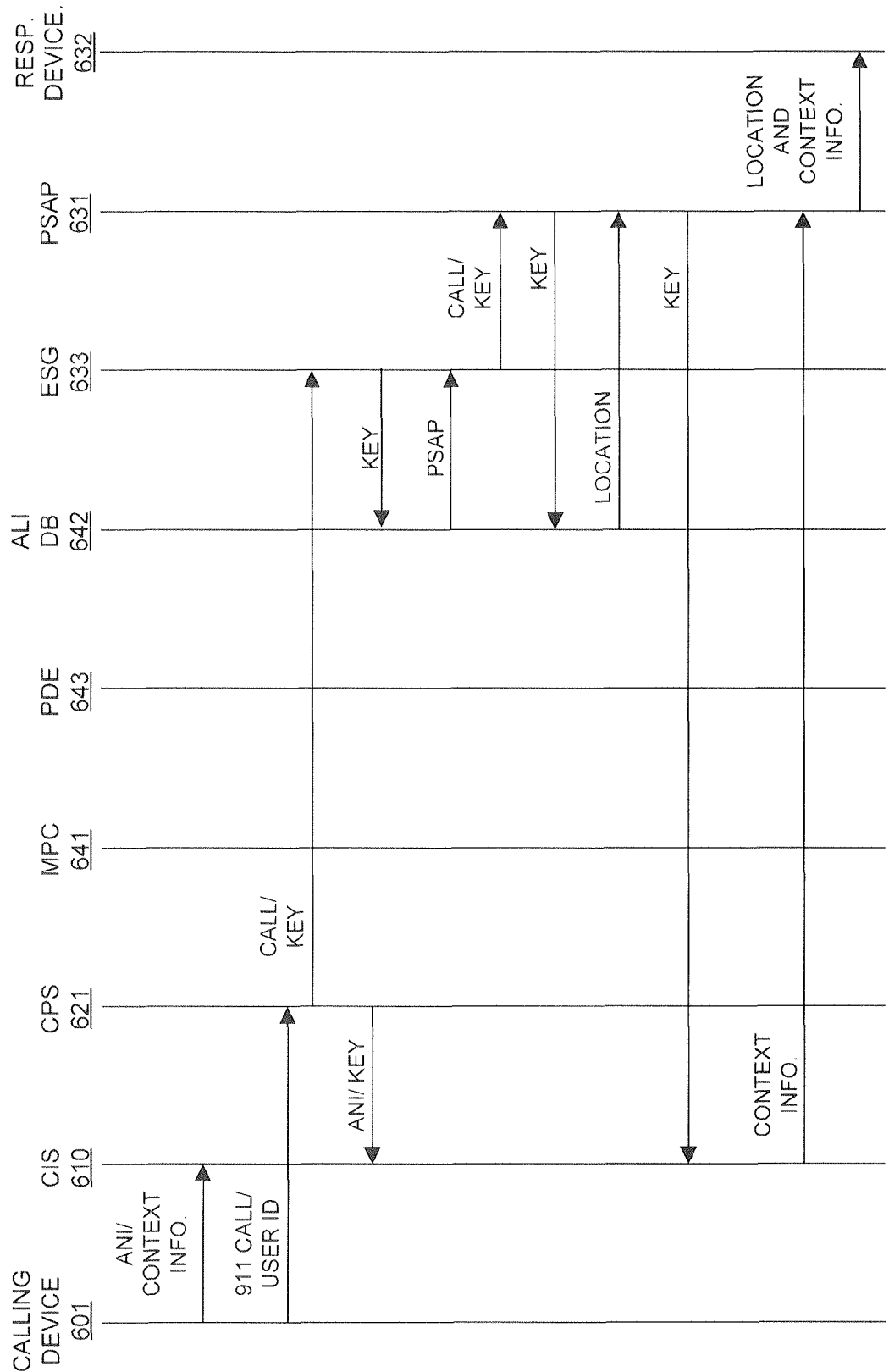
FIG. 8 illustrates a flow diagram in an embodiment of the invention.

FIG. 8 illustrates the operation of communication network 600 in another embodiment of the invention. Initially, a user operating either calling device 601 or some other suitable communication device uploads context information to customer information system 610. During the upload process, the user provides a caller identification in association with which customer information system 610 stores the context information. In this example, a phone number for calling device 601, or the automatic number identification (ANI), is provided to customer information system 610 as the calling identification. The user could connect to customer information system 610 via any well known communication interface.

Later, the caller using calling device 601 places a call for an emergency service, such as by dialing 9-1-1. Calling device 601 transmits a call request to call processing system 621. The all request indicates the dialed digits as well as the ANI for calling device 601.

In response, call processing system 621 selects a key to use henceforth for information correlation. In an example, the key identifies calling device 601 or access equipment utilized by calling device 601 to place the call, such as a modem or terminal adapter system.

Upon selecting the key, call processing system 621 transmits a message to customer information system 610 that indicates both the ANI and the key for the call. Customer information system 610 processes the ANI to determine a context information associated with the ANI. Upon finding the context information, customer information system 610 stores the key in association with the context information.

Call processing system 621 also transfers the call and signaling for the call to emergency service gateway 633. The signaling for the call identifies the key. Emergency service gateway 633 responsively transmits a PSAP request to ALI database 642 that indicates the key. ALI database 642 processes the key to select the appropriate PSAP for the call from PSAP 631 and 632. ALI database 642 returns a response indicating PSAP 631 to emergency service gateway 633. Emergency service gateway 633 transfers the call and signaling for the call to PSAP 631. The key is also included in this signaling.

Upon receiving the call and the key, PSAP 631 transfers a location request to ALI database 642 that indicates the key. ALI database 642 looks-up the location of calling device 601 based on the key and responsively returns the location of calling device 601 in a message to PSAP 631. It should be understood that ALI database 642 could communicate with mobile processing center 641 to determine the location of calling device 601.

PSAP 631 also transfers a context request to customer information system 610. The context request indicates the key. Customer information system 610 processes the key to determine the context information associated with the key. Customer information system 610 returns the selected context information to PSAP 631. PSAP 631 then transfers both the location of calling device 601 and the context information associated with the caller to responder device 602.

As shown by FIG. 7 and FIG. 8, a first responder operating responder device 602 can obtain both location information and context information from PSAP 631. The context information, in addition to the location information, improves the emergency response provided to callers and reduces risks to first responder personnel. In another advantage, the same key used to obtain location information can be used to obtain context information.

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Interface 920 may be distributed among multiple communication devices. Processing system 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described herein for the elements of communication network 300 and communication network 600.

Those skilled in the art will appreciate variations from these embodiments that fall within the scope of the invention. Those skilled in the art will appreciate that the features described above can be combined in various ways to form multiple embodiments of the invention. As a result, the invention is not limited to the specific embodiments described above, but only by the claims and their equivalents.

We claim:

1. A communication network comprising:
a calling device configured to transmit a call request for an emergency call wherein the call request includes a caller identification that identifies a caller;
a call processing system, in a carrier network, configured to receive the call request, transmit a key request to a location provisioning system to obtain a key, generate and transfer first signaling for the emergency call that includes the caller identification and a key, and generate and transfer second signaling for the emergency call that includes the key; and
a customer information system having a plurality of context information stored in association with a plurality of caller identifications and configured to receive the first signaling for the call, process the caller identification to determine a context information from the plurality of context information associated with the caller identification, and store the key in association with the context information.

2. The communication network of claim 1 wherein a public safety answering point is configured to receive the second signaling and responsively transmit a location request indicating the key to a location provisioning system to obtain the location of the calling device based on the key.

3. The communication network of claim 2 wherein the public safety answering point is configured to transmit an information request indicating the key to the customer information system to obtain the context information stored in association with the key.

4. The communication network of claim 3 wherein the customer information system is configured to receive the information request, process the key to determine the context information associated with the key, and transfer the context information to the public safety answering point.

5. The communication network of claim 4 wherein the public safety answering point is configured to transmit the location of the calling device and the context information to a responder device.

6. The communication network of claim 1 wherein the key comprises a media access control (MAC) address.

7. The communication network of claim 1 wherein the context information comprises health information for the caller.

8. The communication network of claim 7 wherein the caller inputs the health information into the customer information system.

9. A method of operating a communication network, the method comprising:

transmitting a call request for an emergency call from a calling device wherein the call request includes a caller identification that identifies a caller;
receiving the call request in a call processing system, in a carrier network;
transmit a key request to a location provisioning system to obtain a key, transferring first signaling for the call from the call processing system wherein the first signaling includes the caller identification and a key;
transferring second signaling for the call from the call processing system to a public safety answering point wherein the second signaling includes the key; and
in a customer information system having a plurality of context information stored in association with a plurality of caller identifications, receiving the first signaling for the call, processing the caller identification to determine a context information from the plurality of context information associated with the caller identification, and storing the key in association with the context information.

10. The method of claim 9 further comprising, in the public safety answering point, receiving the second signaling and responsively transmitting a location request indicating the key to a location provisioning system to obtain the location of the calling device based on the key.

11. The method of claim 10 further comprising, in the public safety answering point, transmitting an information request indicating the key to the customer information system to obtain the context information stored in association with the key.

12. The method of claim 11 further comprising, in the customer information system, receiving the information request, processing the key to determine the context information associated with the key, and transferring the context information to the public safety answering point.

13. The method of claim 12 further comprising, in the public safety answering point, transmitting the location of the calling device and the context information to a responder device.

14. The method of claim 13 further comprising, in the call processing system, transmitting a key request to the location provisioning system to obtain the key.

15. The method of claim 9 wherein the key comprises a media access control (MAC) address.

16. The method of claim 9 wherein the context information comprises health information for the caller.

17. The method of claim 16 wherein the caller inputs the health information into the customer information system.

18. A method of operating a call processing system, the method comprising:
receiving a call request for an emergency call from a calling device wherein the call request includes a caller identification that identifies a caller;
a call processing system, in a carrier network, configured to receive the call request, transmit a key request to a location provisioning system to obtain a key, generating and transferring first signaling for the call from the call processing to a customer information system, wherein the first signaling includes the caller identification and a key, and wherein the customer information system, having a plurality of context information stored in association with a plurality of caller identifications, receives the first signaling for the call, processes the caller identification to determine a context information from the plurality of context information associated with the caller identification, and stores the key in association with the context information; and
generating and transferring second signaling for the call from the call processing system to a public safety answering point wherein the second signaling includes the key.

19. A call processing system comprising:
an interface configured to receive from a calling device a call request for an emergency call that includes a caller identification that identifies a caller;
a processing system, in a carrier network, configured to process the call request transmit a key request to a location provisioning system to obtain a key to generate first signaling for the call that includes the caller identification and a key, and generate second signaling for the call that includes the key; and
the interface further configured to transfer the first signaling to a customer information system, and transfer the second signaling for the call to a public safety answering point;
wherein the customer information system, having a plurality of context information stored in association with a plurality of caller identifications, receives the first signaling for the call, processes the caller identification to determine a context information from the plurality of context information associated with the caller identification, and stores the key in association with the context information.

* * * * *